(12) United States Patent
Jacobs

(10) Patent No.: US 8,400,145 B2
(45) Date of Patent: Mar. 19, 2013

(54) SYSTEMS AND METHODS FOR PERFORMING VIBRATION ANALYSIS USING A VARIABLE-RELUCTANCE SENSOR

(75) Inventor: Mike Jacobs, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 322 days.

(21) Appl. No.: 12/830,841

(22) Filed: Jul. 6, 2010

(65) Prior Publication Data

US 2012/0007590 A1 Jan. 12, 2012

(51) Int. Cl.
*G01V 3/12* (2006.01)
*G01N 27/72* (2006.01)
(52) U.S. Cl. .................... 324/228; 324/207.14
(58) Field of Classification Search .......... 324/228, 324/207.14
See application file for complete search history.

(56) References Cited

U.S. PATENT DOCUMENTS

| 4,754,644 A | 7/1988 | Valentini |
| 5,197,321 A * | 3/1993 | Both ........................ 318/490 |
| 6,812,693 B2 * | 11/2004 | Heinrich et al. ......... 324/207.15 |
| 7,816,911 B2 * | 10/2010 | Taylor et al. ............ 324/207.15 |

* cited by examiner

*Primary Examiner* — Reena Aurora
(74) *Attorney, Agent, or Firm* — Lowe Graham Jones PLLC

(57) ABSTRACT

A balanced bridge variable-reluctance sensor with no internal circuit components, springs, or dielectric for performing vibration analysis in high-vibration, high-temperature, and other extreme environments. The present invention includes a variable-reluctance sensor in a vibration-sensing capacity. The present invention has inherently high reliability due to its simplicity. The sensor is solidly mounted to a structure that is being monitored and allows a vibration wave to pass through a floating sensor bridge. The sensor vibrates at the same frequency as the application being measured.

9 Claims, 3 Drawing Sheets

SYSTEMS AND METHODS FOR PERFORMING VIBRATION ANALYSIS USING A VARIABLE-RELUCTANCE SENSOR

BACKGROUND OF THE INVENTION

Current vibration sensor technology uses accelerometers that have a temperature-limited and sensitive dielectric or spring component. These accelerometers are prone to failure and are relatively costly. Silicon, solid-state, and accelerometer sensors require springs and dielectric compounds that are limited in their environmental installations.

SUMMARY OF THE INVENTION

The present invention provides a balanced bridge variable-reluctance sensor with no internal circuit components or dielectric for performing vibration analysis in high-vibration, high-temperature, and other extreme environments. The present invention includes a variable-reluctance sensor in a vibration-sensing capacity. The present invention has inherently high reliability due to its simplicity. The sensor operates in environments as high as 300 degrees C. The sensor is solidly mounted to a structure that is being monitored and allows a vibration wave to pass through a floating sensor bridge. The sensor vibrates at the same frequency as the application being measured.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
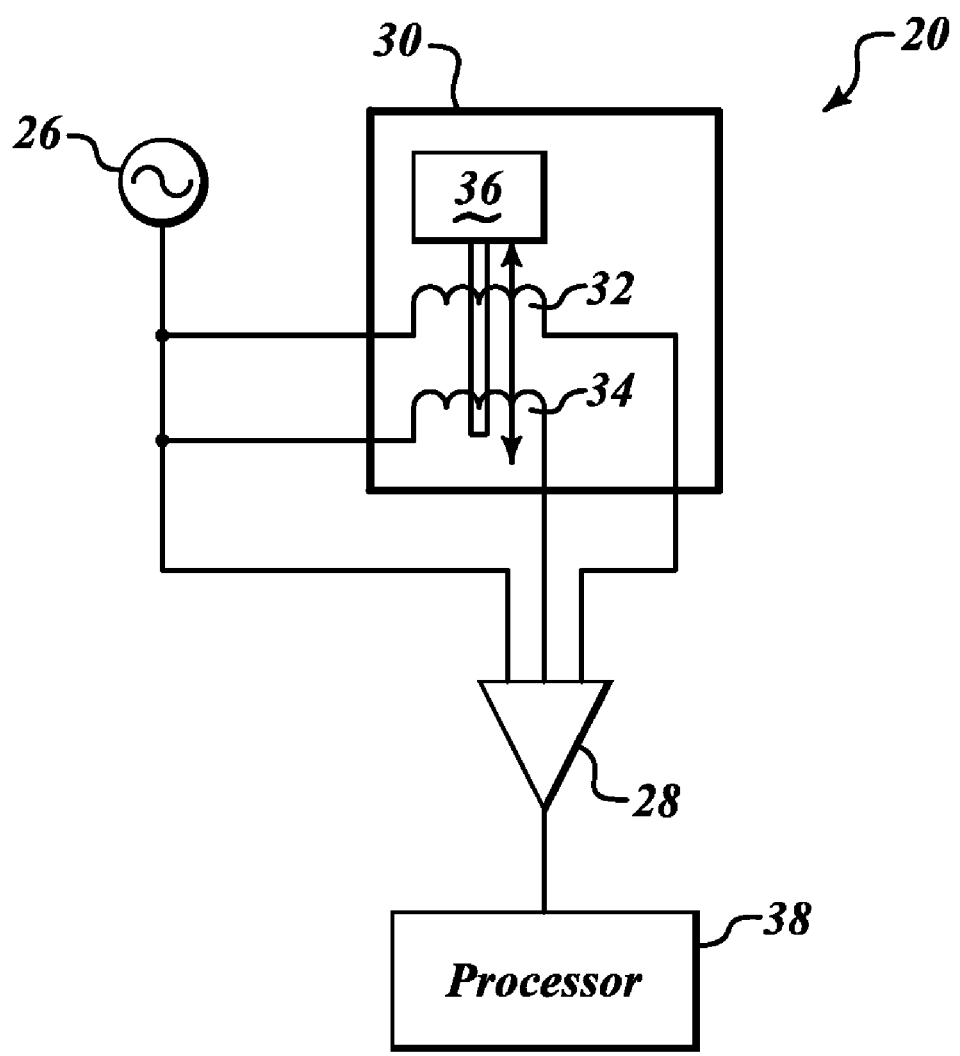
FIG. 1 illustrates a schematic diagram of a sensor circuit formed in accordance with an embodiment of the present invention.

FIG. 1 illustrates an exemplary sensor circuit 20 that uses a variable-reluctance sensor 30 for sensing vibration of a structure to which the variable-reluctance sensor 30 is attached. The sensor circuit 20 also includes an oscillator 26, a comparator 28, and a processor 38.

The oscillator 26 is connected to a first coil 32 within the variable-reluctance sensor 30 and to an output end of a second coil 34 also located within the sensor 30 via a combiner (not shown). The input end of the first coil 32 is connected to a first input of the comparator 28. The output end of the second coil 34 is connected to a second input of the comparator 28. An output of the comparator 28 is attached to the processor 38.

The oscillator 26 sends a signal through the variable-reluctance sensor 30 via the input of the first coil 32. The signal produced by the oscillator 26 compared with the signal at the output of both the first coil 32 and the second coil 34 via the comparator 28. The variable-reluctance sensor 30 also includes a ferrous core 36 that is located in a space in the center of the first and second coils 32, 34. The ferrous core 36 is attached to a first portion of a housing that is flexibly attached to a second portion of the housing that contains the first and second coils 32, 34. The flexible housing portions are hermetically sealed for environmental protection. This is described in more detail below with regard to FIG. 2. As the ferrous core 36 moves relative to the coils 32, 34, a change occurs in the signal that is passing through the coils 32, 34. The comparator 28 removes the signal produced by the oscillator 26 from the combined oscillator/second coil signal, thereby leaving only the change that the signal goes through after it passes through the coils 32, 34. The processor 38 analyzes the output of the comparator 28 to generate an output signal that is sent to an output device 44, such as a display device, to produce a human-readable presentation of the vibration sensed by the variable-reluctance sensor 30.

Figure 2:
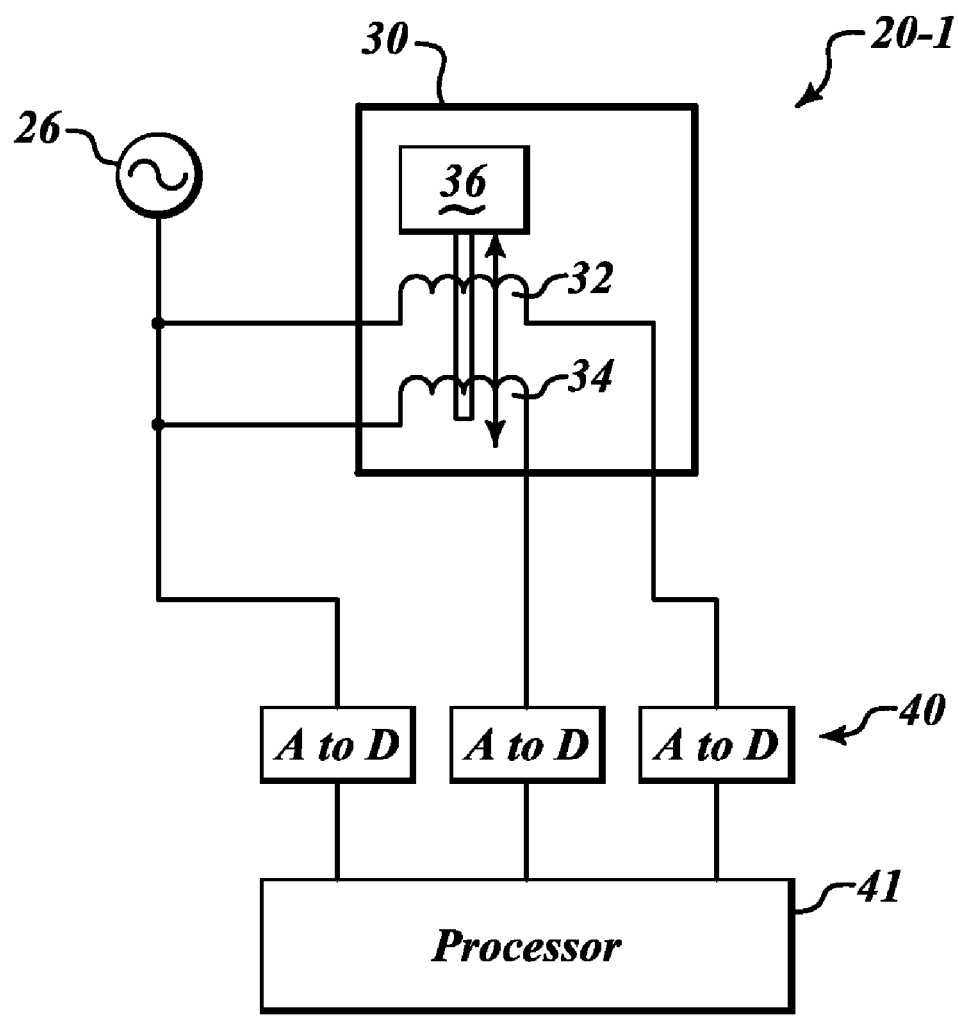
FIG. 2 illustrates a schematic diagram of a sensor circuit formed in accordance with an alternate embodiment of the present invention.

FIG. 2 illustrates a second example sensor circuit 20-1 that includes Analog to Digital (A/D) converters 40 that digitize the signals received from the oscillator 26 and the coils 32, 34. The digital outputs of the A/D converters 40 are sent to a processor 41 for analysis and vibration monitoring.

Figure 3:
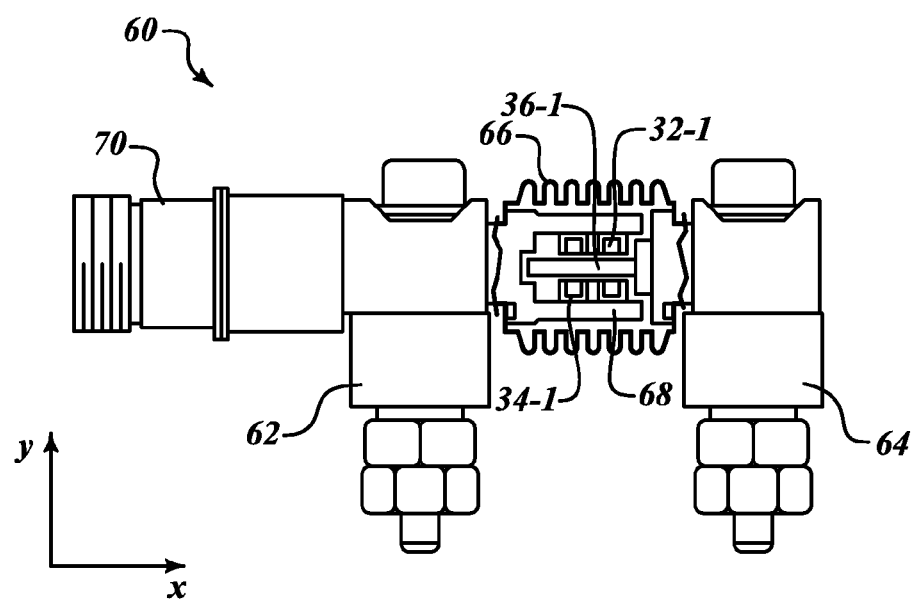
FIG. 3 illustrates a side partial x-ray view of an exemplary sensor formed in accordance with an embodiment of the present invention.

FIG. 3 illustrates an exemplary variable-reluctance sensor 60. The sensor 30-1 includes a first housing 62, a second housing 64, and a bellows device 66 attached to the first and second housings 62, 64. The bellows device 66 provides a cavity between the first housing 62 and the second housing 64. A cylindrical core 68 is attached to the first housing 62. The cylindrical core 68 extends into the cavity formed by the bellows device 66. The cylindrical core 68 includes an inner wall that receives a first electrical coil 32-1 located near an outer edge of the cylindrical core 68 and a second electrical coil 34-1 located closer to a base of the cylindrical core 68. The output of the first and second electrical coils 32-1 and 34-1 are sent to the either the comparator 28 (FIG. 1) or digitized and sent directly to the processor 41 for analysis (FIG. 2). The outputs of first and second coils 32-1, 34-1 pass through the first housing 62 to the plug section 70. A ferrous core 36-1 extends from the second housing 64 into the cavity formed by the cylindrical core 68 between the first and second coils 32-1, 34-1.

The bellows device 66 allows separate motion of the first and second housings 62, 64, thereby allowing the ferrous core 36-1 to move along the X and Y axes, relative to the first and second coils 32-1, 34-1. As the ferrous core 36-1 moves along the X axis, relative to the coils 32-1, 34-1, a voltage shift occurs between the two coils 32-1, 34-1 when a signal is sent across the coils 32-1, 34-1. By comparing the change in voltage over time caused by the movement of the ferrous core 36-1 relative to coils 32-1, 34-1 the frequency and amplitude of a vibration waveform can be determined. Changes in distance from the first housing component 62 to the second housing component 64 of 0.00106 inch to 3.39-9 inches can be measured, with a sensitivity of −0.105 mV/micro inch in a sample circuit. The change in distances over time can be measured and processed to then the actual vibration being measured is determined. This voltage per micro inch resolution could be further refined by design of the coil and core arrangement.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sensor comprising:
   a first section comprising a ferrous component;
   a second section comprising first and second wire coils separated by a predefined distance;

a component configured to flexibly connect the first section to the second section;

an oscillator configured to generate a source signal;

a comparator comprising three inputs, a first input is coupled to the oscillator;

a processor coupled to an output of the comparator, the processor configured to generate an output signal based on signals received from the comparator; and an output device coupled to the processor, the output device configured to receive the generated output signal and provide a presentation based on the received output signal, wherein the ferrous component is received through the first and second wire coils, wherein the first and second sections are attached to a device-under-test, wherein the first and second wire coils are connected in parallel and the oscillator is connected to an input of both wire coils, wherein a second input of the comparator is coupled to the first wire coil and a third input of the comparator is coupled to the second wire coil.

2. The sensor of claim 1, wherein the component configured to flexibly connect the first section to the second section forms a cavity, wherein the ferrous component and the first and second wire coils are at least partially received within the cavity.

3. The sensor of claim 2, wherein the second section comprises an inner circumference wall that receives the first and second wire coils.

4. The sensor of claim 2, wherein the component configured to flexibly connect the first section to the second section comprises a flexible bellows device.

5. The sensor of claim 1, wherein the output signal represents vibration experienced by the device-under-test.

6. A method for sensing vibration of a structure, the method comprising:

sending a signal to a first coil and a second coil, the first and second coils are attached to a first housing and the first housing is attached to the structure, wherein a second housing attached to the structure comprises a ferrous material that is received within the first and second coils, wherein the first and second sections are flexibly attached;

comparing the signal sent to the coils with of the signals outputted from the first coil and the second coil;

determining a vibration signal based on the comparison; and outputting a presentation based on the determined vibration signal.

7. The method of claim 6, further comprising determining a change in distance between the first and second housing based on the determined vibration signal.

8. A sensor comprising:

a first section comprising a ferrous component;

a second section comprising first and second wire coils separated by a predefined distance;

a component configured to flexibly connect the first section to the second section;

an oscillator configured to generate a source signal;

a plurality of analog-to-digital (A/D) converters configured to digitize signals produced by the oscillator, the first wire coil and the second wire coil;

a processor coupled to outputs of the A/D converters, the processor configured to generate an output signal based on signals received from the A/D converters; and an output device coupled to the processor, the output device configured to receive the generated output signal and provide a presentation based on the received output signal wherein the ferrous component is received through the first and second wire coils, wherein the first and second sections are attached to a device-under-test, wherein the first and second wire coils are connected in parallel and the oscillator is connected to an input of the both wire coils.

9. The sensor of claim 8, wherein the output signal represents vibration experienced by the device-under-test.

* * * * *